US006579598B2

(12) United States Patent
Tokunaga et al.

(10) Patent No.: US 6,579,598 B2
(45) Date of Patent: Jun. 17, 2003

(54) INK-JET RECORDING MATERIAL

(75) Inventors: Yukio Tokunaga, Tokyo (JP); Susumu Yamanobe, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/816,408

(22) Filed: Mar. 26, 2001

(65) Prior Publication Data

US 2002/0008752 A1 Jan. 24, 2002

(30) Foreign Application Priority Data

Mar. 28, 2000 (JP) ....................................... 2000-089116

(51) Int. Cl.$^7$ ............................ B32B 27/14; B32B 3/00

(52) U.S. Cl. ....................... 428/195; 428/331; 428/341; 428/500; 428/513; 428/537.5

(58) Field of Search ................................ 428/195, 211, 428/212, 331, 341, 500, 513, 537.5

(56) References Cited

U.S. PATENT DOCUMENTS

| | | | | |
|---|---|---|---|---|
| 5,985,424 A | * 11/1999 | DeMatte et al. | ............ | 428/212 |
| 6,217,166 B1 | * 4/2001 | Saito et al. | ................. | 347/100 |
| 6,326,055 B1 | * 12/2001 | Arai et al. | .................. | 427/195 |
| 6,335,102 B1 | * 1/2002 | Tsubaki et al. | ............. | 428/513 |
| 6,436,515 B1 | * 8/2002 | Ohbayashi et al. | ......... | 428/195 |

FOREIGN PATENT DOCUMENTS

| | | |
|---|---|---|
| EP | 1 095 784 A2 * | 5/2001 |
| EP | 1 146 170 A1 * | 10/2001 |

OTHER PUBLICATIONS

Product information sheet from Aerosil/Degussa website printed on Jun. 16, 2002.*

JIS B 0601 (Japanese Industrial Standard), Surface Roughness, 1994, pp 1–25.

* cited by examiner

*Primary Examiner*—Cynthia H. Kelly
*Assistant Examiner*—B. Shewareged
(74) *Attorney, Agent, or Firm*—Paul E. White, Jr.; Manelli Denison & Selter PLLC

(57) ABSTRACT

There is disclosed an ink-jet recording material which comprises a support in which both surfaces of a base paper are covered by a polyolefin resin, and an ink-receptive layer containing inorganic fine particles and a hydrophilic binder provided on the support, wherein a surface of the support opposite to the surface at which the ink-receptive layer is provided has a ten-point mean roughness Rz measured according to JIS-B-0601 of boarding is 12 to 40 $\mu$m under the condition of a reference length of 8 mm, and preferably a ratio of a total length X of a mean line across the mountain part to a total length Y of a mean line across a valley part, X/Y is 1/10 to 3/1.

10 Claims, No Drawings

INK-JET RECORDING MATERIAL

BACKGROUND OF THE INVENTION

1. Field of the invention

This invention relates to an ink-jet recording material having an ink-receptive layer, more specifically to an ink-jet recording material particularly excellent in feeding and conveying characteristics in a printer, and the surface of which is difficultly damaged by rubbing between the front and the back surfaces at preparation, processing and printing, having high anti-blocking property and having high glossiness and ink-absorption property.

2. Prior Art

As a recording material to be used for an ink-jet recording system, a recording material which comprises a porous ink-receptive layer comprising a pigment such as amorphous silica, etc., and a water-soluble binder such as polyvinyl alcohol, etc., being provided on a support such as a usual paper or the so-called ink-jet recording sheet has generally been known.

There have been proposed recording sheets obtained by coating a silicon-containing pigment such as silica, etc., with an aqueous binder onto a paper support as disclosed in, for example, Japanese Provisional Patent Publications No. 51583/1980, No. 157/1981, No. 107879/1982, No. 107880/1982, No. 230787/1984, No. 160277/1987, No. 184879/1987, No. 183382/1987, No. 11877/1989, and the like.

Also, in Japanese Patent Publication No. 56552/1991, Japanese Provisional Patent Publications No. 188287/1990, No. 81064/1998 No. 119423/1998, No. 175365/1998, No. 203006/1998, No. 217601/1998, No. 20300/1999, No. 20306/1999 and No. 34481/1999, U.S. Pat. No. 5,612,281, and EP 0 813 978 A, and the like, there have been disclosed ink-jet recording materials using synthetic silica fine particles prepared by a gas phase process (hereinafter referred to as "fumed silica"). The fumed silica is ultrafine particles having a mean particle size of a primary particle of several nm to several tens nm, and has characteristics of giving high glossiness and high ink-absorption properties. However, since it is untrafine particles, the surface of the ink-receptive layer is easily damaged and there is a problem that a plural number of sheets is conveyed at once (hereinafter referred to as "double-feeding") when printing is carried out by a printer.

Also, in Japanese Provisional Patent Publication No. 55830/1994, a recording paper has been proposed to improve feeding and conveying characteristics by adding a specific lubricant to the opposed surface of the ink-receptive coating layer, but there are problems of causing blocking during preservation and causing flaws on the surface of the ink-receptive layer. Also, in Japanese Provisional Patent Publication No. 179025/1995, a recording sheet has been proposed in which spherical fine particle polymer is added to a back-coating layer of a support but there are problems that the surface of the ink-receptive layer is easily damaged at the preparation or processing thereof, and particularly when ultrafine particulate silica prepared by a gas phase process is used, smoothness or glossiness of the surface is high so that flaws are conspicuous.

On the other hand, as a support for an ink-jet recording material, paper has conventionally and generally been used, and the paper itself has a role of an ink-absorption layer. In recent years, a photo-like recording sheet has earnestly been desired, and in a recording sheet using a paper support, there are problems of poor glossiness, feeling in quality, water-resistance, cockling after printing (wrinkle or waving), etc. Thus, a water-proof paper support such as a resin laminated paper in which a polyolefin resin such as polyethylene, etc., is coated on the both surfaces of paper (a polyolefin resin-coated paper), a plastic film, etc., has been used. However, these water-proof supports have high smoothness on the surface at which an ink-receptive layer is provided so that they are, different from paper supports, easily damaged by rubbing themselves to cause flaws on the surface of the ink-receptive layer when these materials are laminated and the problem of "double-feeding" is likely caused when feeding paper in a printer at printing. In particular, there is no ink-absorption property in the support itself so that the ink-receptive layer is provided with thick and glossiness is high whereby damages are likely caused and are conspicuous.

Also, to obtain higher ink-absorption property, it is necessary to reduce an amount of a binder relative to the fumed silica, but by reducing an amount of the binder, damages are further increased.

Also, in a recording sheet in which an ink-receptive layer using a relatively large amount of pigment and a hydrophilic binder is provided on a polyolefin resin-coated paper support, a problem of curl newly occurred. In general, a polyolefin resin-coated paper is covered by a thermoplastic resin such as polyolefin, etc., on the both surfaces thereof and in spite of curl balance of the resin-coated paper itself by resin coated amounts on the front and back surfaces thereof, when an ink-receptive layer as mentioned above is coated on one surface thereof, the curl balance therebetween is lost and a problem that the recording sheet curls to the front surface side or the back surface side due to outer environments is generated. These curls occur failure of feeding papers or paper is inclined when it is fed to a printer for printing when the curl is remarkable.

SUMMARY OF THE INVENTION

Accordingly, an object of the present invention is to provide an ink-jet recording material which has photo-like high gloss and high ink-absorption capacity, and is improved in high anti-blocking, high flaw resistance, and high feeding and conveying properties.

The above-mentioned objects of the present invention can be accomplished by the following means. That is, in an ink-jet recording material comprising a support in which both surfaces of a base paper are covered by a polyolefin resin, and an ink-receptive layer containing inorganic fine particles and a hydrophilic binder provided on the support, a surface of the support opposite to the surface at which the ink-receptive layer is provided has a ten-point mean roughness Rz measured according to JIS-B-0601 of boarding is 12 to 40 $\mu$m under the condition of a reference length of 8 mm. Preferably, an opposed surface of the support to the surface on which the ink-receptive layer is provided has 10 or more mountains in a sectional surface curve measured by the conditions of a reference length of 8 mm according to JIS-B-0601, and a ratio of a total length X of a mean line across the mountain part to a total length Y of a mean line across a valley part, X/Y is 1/10 to 3/1.

DESCRIPTION OF THE PREFERRED EMBODIMENTS

In the following, the embodiments of the present invention are explained in detail.

A polyolefin resin-coated paper support (hereinafter referred to as "a resin-coated paper") to be used in the present invention is explained in detail. In the resin-coated paper to be used in the present invention, its water content is not particularly limited, and preferably from curling property in the range of 5.0 to 9.0%, more preferably in the range of 6.0 to 9.0%. The water content of the resin-coated paper can be measured by using any kinds of water-content measuring method. For example, an infrared water content meter, an absolute dry weight method, a permittivity method, a Curl Fisher method, etc., may be used.

A base paper constituting the resin-coated paper to be preferably used in the present invention is not particularly limited, and any paper generally used may be employed. More preferably a smooth base paper such as that used as paper for a photographic support may be used. As pulp for constituting the base paper, natural pulp, regenerated pulp, synthetic pulp, etc. may be used singly or in combination of two or more. In the base paper, various additives conventionally used in the papermaking industry such as a sizing agent, a strengthening additive of paper, a loading material, an antistatic agent, a fluorescent brightener, a dye, etc. may be formulated.

Moreover, a surface sizing agent, a surface strengthening additive of paper, a fluorescent brightener, an antistatic agent, a dye, an anchoring agent, etc. may be coated on the surface of the sheet.

A thickness of the base paper is not particularly limited, and preferably that having a good surface smoothness prepared by compressing paper during paper-making or after paper-making by applying pressure using a calender, etc. A basis weight thereof is preferably 30 to 250 g/$m^2$.

As a resin of the resin-coated paper, a polyolefin resin or a resin which cures by irradiation of electronic rays may be used. The polyolefin resin may include a homopolymer of an olefin such as low density polyethylene, high density polyethylene, polypropylene, polybutene, polypentene, etc.; a copolymer comprising two or more olefins such as an ethylene-propylene copolymer, etc.; or a mixture thereof, and these polymers having various densities and melt viscosity indexes (melt index) may be used singly or in combination of two or more.

Also, to the resin of the resin-coated paper, various kinds of additives including a white pigment such as titanium oxide, zinc oxide, talc, calcium carbonate, etc.; an aliphatic amide such as stearic amide, arachidamide, etc.; an aliphatic acid metal salt such as zinc stearate, calcium stearate, aluminum stearate, magnesium stearate, etc.; an antioxidant such as Irganox 1010, Irganox 1076 (both trade names, available from Ciba Geigy AG), etc.; a blue-color pigment or dye such as cobalt blue, ultramarine blue, cecilian blue, phthalocyanine blue, etc,; a magenta-color pigment or dye such as cobalt violet, fast violet, manganese violet, etc.; a fluorescent brightener, an UV absorber, etc. may be preferably added optionally combining two or more.

The resin-coated paper to be preferably used in the present invention can be prepared, in the case of using a polyolefin resin, by casting a melted resin under heating on a running base paper, which is so-called the extrusion coating method, whereby the both surfaces of the base paper are coated by the resin. In the case of using a resin which cures by irradiation of electronic rays, the resin is coated on a base paper by means of a coater conventionally used such as a gravure coater, a blade coater, etc., then, electronic rays are irradiated to the resin whereby coating the base paper with the resin. Also, it is preferred to subject an activation treatment to a base paper before coating the resin to the base paper, such as a corona discharge treatment, a flame treatment, etc. The surface (the front surface) on which an ink-receptive layer is to be coated of the support is a gloss surface or a matte surface depending on the purposes, and particularly, a gloss surface is predominantly used. It is not necessarily subjected to resin coating at the back surface of the base paper, but in view of preventing curl, it is preferred to coat the surface of the base paper with the resin. The back surface is usually a non-gloss surface, and if necessary, the activation treatment such as the corona discharge treatment, the flame treatment, etc. may be applied to the front surface or to the both surfaces of the front and back surfaces. Also, a thickness of the resin layer is not particularly limited, and is generally in the range of about 5 to about 50 μm on the front surface or both of the front and back surfaces.

A surface on which an ink-receptive layer is to be formed by coating of a resin-coated paper of the present invention (hereinafter referred to as "the front surface of the resin-coated paper") can be prepared by heating and melting a polyolefin resin mainly on one surface of a base paper by an extruder, extruding the material between the base paper and cooling roll in a film state, adhering by compression and cooling. At this time, the cooling roll is used for formation of a front surface shape of the coating layer made of the polyolefin resin. The surface of the resin layer can be subjected to embossing treatment such as a mirror surface, slightly rough surface, or patterned surface such as silk state or matte state, etc. depending on the shape of the surface of the cooling roll.

An opposed surface to the surface on which an ink-receptive layer is to be formed by coating of a resin-coated paper of the present invention (hereinafter referred to as "the back surface of the resin-coated paper") can be prepared by heating and melting a polyolefin resin mainly on the back surface of a base paper by an extruder, extruding the material between the base paper and cooling roll in a film state, adhering by compression and cooling. At this time, the cooling roll is used for formation of a back surface shape of the coating layer made of the polyolefin resin. The surface of the resin layer can be subjected to embossing treatment such as a slightly rough surface, or patterned such as silk state or matte state, etc. depending on the shape of the surface of the cooling roll so that it has Rz regulated by JIS-B-0601 of 12 to 40 μm If the Rz at the back surface of the resin-coated paper is less than 12 μm, a contact surface with the surface of the ink-receptive layer becomes large and adhesiveness is increased by deformation of the polyolefin resin due to a load so that it is not preferred in the points of blocking during storage, flaw resistance or feeding and conveying characteristics. On the other hand, if it exceeds 40 μm, it is necessary to thicken the resin coating layer at the back surface so that the recording material finally becomes a thicker material and handling of the material is troublesome, and also, hand feeling becomes rough whereby it is not preferred. The Rz is more preferably about 15 to about 30 μm.

The ten point mean roughness Rz is a measured value by a contact stylus type three-dimensional surface roughness meter, and was measured with a reference length of 8 mm. When the Rz is obtained, the reference length is extracted from the portion at which there is no excessively high mountain or too deep valley which is deemed to be flaw. Also, when the surface shape has a directional property, it is to be measured to the direction at which the Rz appears with the most large value. The mountain and valley of the sectional surface curve are defined by the definition described in JIS-B-0601.

In the present invention, a number of the mountain of the sectional surface curve measured by the conditions of the reference length of 8 mm with the Rz regulated according to JIS-B-0601 at the back surface of the resin-coated paper is 5 or more, more preferably 10 or more. If a number of the mountain is less than 5, an effect of feeding and conveying characteristics can be difficultly obtained. To the contrary, if it is too much, a contact surface with the front surface increases so that it is preferably 500 or less.

A ratio of a total length X of a mean line across the mountain part of the sectional surface curve under the conditions of the reference length of 8 mm at the back surface of the resin coated paper to a total length Y of a mean line across a valley part of the same, X/Y is preferably within the range of 1/10 to 3/1. If it is less than 1/10, improved effects in feeding and conveying characteristics tend to be lowered. If it exceeds 3/1, a contacting surface with the front surface of the ink-receptive layer becomes large so that blocking resistance or feeding and conveying characteristics tend to be lowered.

In the present invention, the Rz regulated by JIS-B-0601 of the front surface of the ink receptive layer is preferably set to 18 μm or less which is clearly smaller than the Rz at the back surface of the resin-coated paper since both of the surfaces have little traction, and have good feeding and conveying characteristics and surface glossiness. The front surface of the ink receptive layer is more preferably subjected to a slightly roughing treatment, a mirror surface treatment or other embossing treatment so that the Rz becomes 20 μm or less. It is preferred that a number of the mountain is made as little as possible, or a ratio of the total lengths of mean lines at the mountain part and the valley part of the sectional surface curve is larger than 2/1.

A method of providing a resin-coated layer on the front surface or the back surface of paper may include, in addition to the method in which a resin is melted under heating, extruded and coated on paper, a method in which an electron beam curing resin is coated on paper and an electron beam is irradiated to the resin to form a cured film, a method in which a coating liquid containing a polyolefin resin emulsion is coated on paper, and after drying, a surface smoothening treatment is carried out, and the like. In either of the case, a resin-coated paper which can be applied to the present invention can be obtained by carrying out an embossing treatment with a heat roll having an unevenness, etc.

In the present invention, at the surface of the resin-coated paper on which an ink-receptive layer is provided by coating, a subbing layer may be further provided under the ink-receptive layer. The subbing layer can be previously provided on the resin layer surface of the support by coating and drying before the ink-receptive layer is provided by coating. The subbing layer preferably comprises a film-formable water-soluble polymer or polymer latex, etc. as a main component. The subbing layer more preferably comprises a water-soluble polymer such as gelatin, polyvinyl alcohol, polyvinyl pyrrolidone, water-soluble cellulose, etc., particularly preferably gelatin. An amount to be attached of the water-soluble polymer to the surface of the resin layer is preferably about 10 to about 500 mg/m$^2$, more preferably about 20 to about 300 mg/m$^2$. Moreover, the subbing layer may further contain a surfactant, a film hardening agent, etc. Furthermore, before coating the subbing layer, the resin-coated paper is preferably subjected to a corona discharge treatment.

In the polyolefin resin-coated paper support according to the present invention, a material in which various kinds of back-coating layer is/are provided for writability, antistatic property, curl preventive property, etc., within the range which does not lower the effects of the present invention is also included. The back-coating layer preferably comprises a binder as a main component and an amount to be coated is preferably about 100 to about 500 mg/m$^2$ in terms of a solid content. To the back-coating layer, a hydrophilic binder, a latex, an organic pigment, an inorganic pigment, an inorganic antistatic agent, an organic antistatic agent, a curing agent, a surfactant, etc., may be added with an optional combination.

In the present invention, as the inorganic fine particles to be contained in the ink-receptive layer, there may be mentioned inorganic fine particles having an average particle size of a primary particle of 100 nm or less, and specifically mentioned light calcium carbonate, heavy calcium carbonate, magnesium carbonate, kaolin, titanium dioxide, zinc oxide, zinc hydroxide, calcium silicate, magnesium silicate, synthetic silica, alumina, hydrated alumina, aluminum hydroxide, magnesium hydroxide, etc. In the points of high printing density, clear image and inexpensive manufacturing cost, synthetic silica, alumina and hydrated alumina are preferred and fumed silica is particularly preferred.

The recording material for ink-jet recording of the present invention has an ink-receptive layer containing an inorganic fine particles, preferably fumed silica, on the polyolefin resin-coated paper support. Fumed silica is contained preferably 50% by weight or more, more preferably 60% by weight or more, further preferably 70% by weight to 90% by weight based on the total solid content of the ink-receptive layer. If it exceeds 90% by weight, strength of the ink-receptive layer is lowered, and a problem of scattering powder in the preparation step or processing step arises and flaws tend to be caused when a printed product is treated.

In synthetic silica, there are two types of materials, one (precipitated silica) of which is prepared by the wet process and the other (fumed silica) is prepared by the gas phase process. Usual silica fine particles mean those prepared by the wet process in many cases. As the silica prepared by the wet process, there are (1) a silica sol obtained by metathesis of sodium silicate by an acid or passing through an ion exchange resin layer; (2) a colloidal silica obtained by heating and maturing the silica sol of (1); (3) a silica gel obtained by gelling silica sol in which formation conditions thereof are changed whereby primary particles of a silica gel having a diameter of several μm to 10 μm are agglomerated to form three-dimensional secondary particles; and (4) a synthetic silicic acid compound mainly comprising silicic acid obtained by heating silica sol, sodium silicate, sodium aluminate, etc.

Fumed silica to be preferably used in the present invention is also called to as the drying method silica opposed to the wet method silica, and the fumed silica can be generally prepared by a flame hydrolysis method. More specifically, it has been known a method in which silicon tetrachloride is burned with hydrogen and oxygen. In this method, silanes such as methyl trichlorosilane, trichlorosilane, etc., may be used alone in place of silicon tetrachloride or in combination with silicon tetrachloride. The fumed silica is commercially available from Nippon Aerosil K.K. (Japan) under the trade name of Aerosil, and K.K. Tokuyama (Japan) under the trade name of QS type, etc.

In the present invention, it is preferred to use fumed silica having an average primary particle size of about 30 nm or less, and to obtain higher glossiness, it is more preferably 3 to 10 nm and has a specific surface area measured by the BET (Brunauer-Emmett-Teller) method of about 250 to about 500 $m^2$/g. The BET method herein mentioned means one of a method for measuring surface area of a powder material by a gas phase adsorption method and is a method of obtaining a total surface area possessed by 1 g of a sample, i.e., a specific surface area, from an adsorption isotherm. In general, as an adsorption gas, a nitrogen gas has been used in many cases, and a method of measuring an adsorption amount obtained by the change in pressure or a volume of a gas to be adsorbed has most frequently been used. Most famous equation for representing isotherm of polymolecular adsorption is a Brunauer-Emmett-Teller equation which is also called to as a BET equation and has widely been used for determining a surface area of a substance to be examined. A specific surface area can be obtained by measuring an adsorption amount based on the BET equation and multiplying the amount with a surface area occupied by the surface of one adsorbed molecule.

When the fumed silica is used, a recording material having good ink absorption property and high glossiness can be obtained, but there are problems that aggregation property of secondary particles is weak and the surface is easily damaged which is supposed to be less number of silanol group on the surface of the silica particles. Due to these problems, occurrence of flaws by rubbing of the back and the front surfaces when the product is winding becomes a problem. These problems can be removed by the present invention.

In the present invention, an amount of the fumed silica to be contained in the ink-receptive layer is preferably in the range of about 10 to about 30 g/$m^2$, more preferably in the range of about 13 to about 30 g/$m^2$. If the content of the fumed silica exceeds the above range, surface cracks tend to be caused while if it is less than the above range, ink-absorption property becomes poor. The ink-receptive layer containing the fumed silica preferably contains a binder to maintain the characteristic as a film. As the binder, there may be mentioned, for example, a polymer latex such as a styrene-butadiene copolymer, an acrylic polymer, etc., or a hydrophilic binder such as polyvinyl alcohol, polyvinyl pyrrolidone, gelatin, carboxymethyl cellulose, etc., and a hydrophilic binder which has high transparency and gives high permeability of ink is preferably used. For using the hydrophilic binder, it is important that the hydrophilic binder does not clog voids by swelling at an initial stage of permeating ink. In this point of view, a hydrophilic binder having a relatively low swellability at around a room temperature. Particularly preferred hydrophilic binder is a completely or partially saponified polyvinyl alcohol or a cation-modified polyvinyl alcohol. For dispersing the fumed silica, a dispersing machine conventionally known such as a high-pressure homogenizer, ball mill, etc. may be used.

Among the polyvinyl alcohol, particularly preferred is a partially or completely saponified polyvinyl alcohol having a saponification degree of 80% or more. It is also preferred that the polyvinyl alcohol has an average polymerization degree of about 500 to about 5000.

Also, as the cation-modified polyvinyl alcohol, there may be mentioned a polyvinyl alcohol having a primary to tertiary amino group or a quaternary ammonium group at the main chain or the side chain thereof as disclosed in, for example, Japanese Provisional Patent Publication No. 10483/1986.

Also, other hydrophilic binder may be used in combination, but an amount thereof is preferably 20% by weight or less based on the amount of the polyvinyl alcohol.

An amount of the hydrophilic binder to be used in combination with the fumed silica is preferably 35% by weight or less, more preferably 10 to 30% by weight based on the amount of the fumed silica. To obtain a high ink-absorption property, an amount of the binder is preferably a small ratio to that of the fumed silica but surface cracks or folding cracks are more likely caused.

Also, for improvement in curl property which effects to feeding and conveying characteristics in a printer of the recording material for ink-jet recording of the present invention, it is preferred that the polyolefin resin layer at the opposed surface to the surface on which the ink-receptive layer is provide of the support contains a high-density polyethylene resin having a density of 0.95 g/$cm^3$ or more. Also, a content of said high density polyethylene resin is preferably about 150% by weight or more based on the total amount of the hydrophilic binder in the ink-receptive layer and its upper limit is about 500% by weight, and more preferably in the range of about 200 to about 450% by weight. In this case, the hydrophilic binder contained in the ink-receptive layer is preferably polyvinyl alcohol.

When a polyolefin resin-coated paper for coating a coating liquid for forming an ink-receptive layer is prepared by covering both surfaces of paper by using a polyolefin resin, it has been known to regulate coating amounts of the polyolefin resin on the both surfaces to prevent from causing curl. When a porous ink-receptive layer containing inorganic fine particles such as fumed silica and a hydrophilic binder is provided by coating, the ink-receptive layer causes a force to generate curl on the surface during a coating and drying process (curl in a concave shape to the front surface side is called to as "+curl", and the reverse curl to the above is called to as "−curl" in the following). If an amount of the hydrophilic binder in the ink-receptive layer is increased, the +curl becomes remarkable in the coating and drying process. Not only in the coating and drying process, but also the resulting recording material for ink-jet recording is placed in various environments, curl occurs, and the curl of the recording material is also deeply related to an amount of the hydrophilic binder contained in the ink-receptive layer. As a method of correcting the curl, there is a method of generating an intentional curl by the difference in a coated amount of the polyolefin resin or in the density of the resin to the opposed surface of the recording material. In the present invention, by using a high density polyethylene resin having a density of 0.95 or more in the polyolefin resin layer provided at the surface opposite to the surface at which the ink-receptive layer is provided by coating on the support, and making the relation between the coated amount of the above resin and the amount of the hydrophilic binder in the ink-receptive layer specific conditions, the resulting recording material is flat under various environmental conditions and curl is hardly generated.

In the present invention, a water-soluble metallic compound is preferably added to the ink-receptive layer so that it is possible to further prevent from causing surface cracks. Accordingly, it is possible to further reduce the amount of the hydrophilic binder and further increase the amount of the fumed silica to improve ink absorption property of the ink-receptive layer.

The water-soluble metallic compound to be used in the present invention may include, for example, as a water-soluble polyvalent metallic salt, a water-soluble salt of a metal selected from the group consisting of calcium, barium, manganese, copper, cobalt, nickel, aluminum, iron, zinc, zirconium, titanium, chromium, magnesium, tungsten, and molybdenum. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc bromide, zinc chloride, zinc nitrate hexahydrate, zinc sulfate, titanium chloride, titanium sulfate, zirconium acetate, zirconium chloride, zirconium oxychloride octahydrate, zirconium hydroxychloride, zirconium nitrate, basic zirconium carbonate, zirconium hydroxide, ammonium zirconium carbonate, potassium zirconium carbonate, zirconium sulfate, zirconium fluoride, chromium acetate, chromium sulfate, magnesium sulfate, magnesium chloride hexahydrate, magnesium citrate nonahydrate, sodium phosphorus wolframate, tungsten sodium citrate, dodecawolframatophosphate n hydrate, dodecawolframatosilicate 26 hydrate, molybdenum chloride, dodecamolybdatephosphate n hydrate, etc.

In the present invention, a cationic polymer is preferably added to the fumed silica-containing layer to improve water resistance. As the cationic polymers to be used in the present invention, there may be preferably mentioned polyethyleneimine, polydiallylamine, polyallylamine, polyalkylamine, as well as polymers having a primary to tertiary amino group or a quaternary ammonium group as disclosed in Japanese Provisional Patent Publications No. 20696/1984, No. 33176/1984, No. 33177/1984, No. 155088/1984, No. 11389/1985, No. 49990/1985, No. 83882/1985, No. 109894/1985, No. 198493/1987, No. 49478/1988, No. 115780/1988, No. 280681/1988, No. 40371/1989, No. 234268/1994, No. 125411/1995 and No. 193776/1998, etc. A number average molecular weight (Mn) of these cationic polymers to be used in the present invention is preferably about 5,000 or more, more preferably about 5,000 to about 100,000.

An amount of these cationic polymers is preferably about 1 to about 10% by weight, more preferably about 2 to about 7% by weight based on the amount of the fumed silica.

In the present invention, various kinds of oil droplets are preferably added to the ink-receptive layer to improve brittleness of a film. As such oil droplets, there may be mentioned a hydrophobic organic solvent having a high boiling point (for example, liquid paraffin, dioctyl phthalate, tricresyl phosphate, silicone oil, etc.) or polymer particles (for example, particles in which at least one of a polymerizable monomer such as styrene, butyl acrylate, divinyl benzene, butyl methacrylate, hydroxyethyl methacrylate, etc. is polymerized) each having a solubility in water at room temperature of 0.01% by weight or less. Such oil droplets can be used in an amount in the range of about 10 to about 50% by weight based on the amount of the hydrophilic binder.

In the present invention, it is preferred to use, in combination with the hydrophilic binder, a cross-linking agent (film hardening agent) of said binder. Specific examples of the cross-linking agent may include an aldehyde type compound such formaldehyde and glutaraldehyde; a ketone compound such as diacetyl and chloropentanedione; bis(2-chloroethylurea)-2-hydroxy-4, 6-dichloro-1,3,5-triazine, a compound having a reactive halogen as disclosed in U.S. Pat. No. 3,288,775; divinylsulfone; a compound having a reactive olefin as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat. Nos. 3,017,280 and No. 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid, a dioxane derivative such as dihydroxydioxane, an inorganic cross-linking agent such as chromium alum, potassium alum, zirconium sulfate, boric acid and a borate, and they may be used singly or in combination of two or more. Among these, boric acid or a borate is particularly preferred. An amount of the cross-linking agent is preferably about 0.1 to about 40% by weight, more preferably about 0.5 to about 30% by weight based on the hydrophilic binder constituting the ink-receptive layer.

In the present invention, to the ink-receptive layer, various kinds of conventionally known additives such as a coloring dye, a coloring pigment, a fixing agent of an ink dye, an UV absorber, an antioxidant, a dispersant of the pigment, an antifoaming agent, a leveling agent, an antiseptic agent, a fluorescent brightener, a viscosity stabilizer, a pH controller, etc. may be added.

In the present invention, the coating method of the subbing layer, the back-coating layer and the ink-receptive layer is not particularly limited, and a coating method conventionally known in the art may be used. For example, there may be mentioned a slide bead system, a curtain system, an extrusion system, an air knife system, a roll coating system, a rod bar coating system, a bar coater system, a dipping system, etc.

EXAMPLES

In the following, the present invention is explained in more detail by referring to Examples, but the present invention is not limited by these Examples.

Example 1

A mixture of a bleached kraft pulp of hardwood (LBKP) and a bleached sulfite pulp of hardwood (LBSP) with a ratio of 1:1 was subjected to beating until it becomes 300 ml by Canadian Reference Freeness to prepare a pulp slurry. To the slurry were added alkyl ketene dimer in an amount of 0.5% by weight based on the amount of the pulp as a sizing agent, polyacrylamide in an amount of 1.0% by weight based on the same as a strengthening additive of paper, cationic starch in an amount of 2.0% by weight based on the same, and polyamide epichlorohydrin resin in an amount of 0.5% by weight based on the same, and the mixture was diluted by water to prepare a 1% slurry. This slurry was made paper by a tourdrinier paper machine to become a basis weight of $170 g/m^2$ and dried and subjected to moisture conditioning to prepare a base paper for a polyolefin resin-coated paper. A polyethylene resin composition comprising 100% by weight of a low density polyethylene having a density of 0.918 $g/cm^3$ and 10% by weight of anatase type titanium oxide dispersed uniformly in the resin was melted at 320° C. and the melted resin composition was subjected to extrusion coating on the above-mentioned base paper with a thickness of 35 $\mu$m by 200 m/min and subjected to extrusion coating by using a cooling roll subjected to slightly roughening treatment. Rz of the front surface was 10 $\mu$m. On the other surface of the base paper, a resin composition comprising 70 parts by weight of a high density polyethylene resin having a density of 0.962 g/$cm^3$ and 30 parts by weight of a low density polyethylene resin having a density of 0.918 g/$cm^3$ was melted at 320° C. and the melted resin composition was subjected to extrusion coating with a thickness of 30 μm and subjected to extrusion coating by using a cooling roll subjected to roughening treatment. Rz of the back surface of the resin-coated paper was 20 μm and the mountain was present with a number of 60 in the 8 mm reference length. A ratio of the total length X of a mean line across the mountain part of the sectional surface curve to the total length Y of a mean line across a valley part of the same, X/Y was 1/8.

To the front surface of the above-mentioned polyolefin resin-coated paper was subjected to high frequency corona discharge treatment, and then, the following subbing layer composition was coated thereon with a gelatin amount of 50 mg/$m^2$ and dried to prepare a support. Incidentally, all "part" in the present specification means "part by weight".

| <Subbing layer composition> | |
|---|---|
| Lime-treated gelatin | 100 parts |
| Sulfosuccinic acid-2-ethylhexyl ester salt | 2 parts |
| Chromium alum | 10 parts |

On the above-mentioned support was coated an ink-receptive layer coating liquid having the following composition by a slide coating apparatus and dried. The ink-receptive layer coating liquid shown below was so prepared that an amount of the fumed silica became 9% by weight with a solid concentration. This coating liquid was coated on the above-mentioned support so that a coated amount of the fumed silica became 19 g/$m^2$ with a solid content and dried. Rz of the ink-receptive layer provided surface was 10 μm.

| <Ink-receptive layer coating liquid> | |
|---|---|
| Fumed silica<br>(Average primary particle size: 7 nm, Specific surface area by the BET method: 300 $m^2$/g) | 100 parts |
| Dimethyldiallyl ammonium chloride homopolymer<br>(Shallol DC902P, trade name, available from Daiichi Kogyo Seiyaku K. K., Japan, molecular weight (Mn): 9000) | 4 parts |
| Boric acid | 3 parts |
| Polyvinyl alcohol<br>(Saponification degree: 88%, Average polymerization degree: 3,500) | 20 parts |
| Surfactant | 0.3 part |

Feeding and conveying characteristics, anti-blocking property, flaw property of the ink-receptive layer, ink absorption property and glossiness of the ink-receptive layer of the thus prepared recording material were evaluated by the following methods. The results are shown in Table 1.

Feeding and Conveying Characteristics

Feeding and conveying characteristics were evaluated by carrying out 100 sheets of continuous printing by using an ink-jet printer MJ-5100C (trade name, available from Seiko Epson K.K., Japan) under the conditions of 20° C. and 65% RH (relative humidity).

○: No feeding and conveying error such as double-feeding, clogging of paper, etc. occurred.

Δ: One or two times of feeding and conveying error such as double-feeding, clogging of paper, etc. occurred.

X: Three or more times of feeding and conveying error such as double-feeding, clogging of paper, etc. occurred.

Anti-blocking Property

Two sheets of the recording materials for ink-jet recording which were not printing were piled and allowed to stand with a pressure of 20 g/$cm^2$ from upward under the conditions of 20° C. and 65% RH for 12 hours. Thereafter, the state of blocking was observed with eyes.

○: No blocking was admitted.

Δ: Slight blocking was admitted but practically no problem.

X: Blocking occurred and the material cannot be used practically.

Flaw Property of Ink-receptive Layer

Two sheets of the recording materials for ink-jet recording which were not printing were piled and the lower recording material was drawn out under the state that 100 g of a weight was placed on the two sheets of the recording materials, and flaws of the ink-receptive layer of the drawn out material was observed with eyes.

○: No flaw of the ink-receptive layer was admitted.

Δ: Slight flaw of the ink-receptive layer was admitted but practically no problem.

X: Flaw of the ink-receptive layer remarkably occurred and the material cannot be used practically.

Ink Absorption Property

The recording materials for ink-jet recording was subjected to black solid printing by using an ink-jet printer MJ-5100C (trade name, available from Seiko Epson K.K., Japan) under the conditions of 20° C. and 65% RH and ink absorption property was evaluated.

○: Glossiness at the printed portion was lost shorter than 5 seconds.

Δ: Glossiness at the printed portion was lost between 5 seconds and shorter than 10 seconds.

X: Glossiness at the printed portion was lost over 10 seconds.

Glossiness of Ink-receptive Layer

The recording materials for ink-jet recording which were not printing prepared in Examples 1 to 10 and Comparative examples 1 and 2 were observed with eyes and relative comparison was carried out.

○: It is the same level as Example 1 and extremely good.

Δ: It is lower than the level of Example 1 and good.

X: It is markedly lower than the level of Example 1.

Example 2

In the same manner as in Example 1 except for omitting a subbing layer of Example 1, a recording material for ink-jet recording of Example 2 was obtained and evaluated in the same manner as in Example 1. The results are shown in Table 1.

Example 3

In the same manner as in Example 1 except for changing the cooling roll at the back surface, a polyolefin resin-coated paper having Rz at the back surface of 12 μm was prepared. At the back surface of the resin-coated paper, the mountain was present with a number of 80 within the 8 mm reference length. A ratio of the total length of a mean line across the mountain part of the sectional surface curve to the total length of a mean line across a valley part of the same was 1/1. In the same manner as in Example 1 except for the above, a recording material for ink-jet printing of Example 3 was obtained and evaluated in the same manner as in Example 1. The results are shown in Table 1.

Example 4

In the same manner as in Example 1 except for changing the extrusion coating so that the thickness of the front surface resin layer to 50 μm and that of the back surface resin layer to 50 μm and further changing the cooling roll at the back surface resin layer to further rough unevenness for emboss treatment, a polyolefin resin-coated paper having Rz at the back surface of 40 μm was prepared. At the back surface of the resin-coated paper, the mountain was present with a number of 15 within the 8 mm reference length. A ratio of the total length of a mean line across the mountain part of the sectional surface curve to the total length of a mean line across a valley part of the same was 3/1. In the same manner as in Example 1 except for the above, a recording material for ink-jet printing of Example 4 was obtained and evaluated in the same manner as in Example 1. The results are shown in Table 1.

Example 5

In the same manner as in Example 1 except for changing the cooling roll at the back surface, a polyolefin resin-coated paper having Rz at the back surface of 20 μm was prepared. At the back surface of the resin-coated paper, the mountain was present with a number of 55 within the 8 mm reference length. A ratio of the total length of a mean line across the mountain part of the sectional surface curve to the total length of a mean line across a valley part of the same was 4/1. In the same manner as in Example 1 except for the above, a recording material for ink-jet printing of Example 5 was obtained and evaluated in the same manner as in Example 1. The results are shown in Table 1.

Example 6

In the same manner as in Example 1 except for changing the cooling roll at the back surface, a polyolefin resin-coated paper having Rz at the back surface of 20 μm was prepared. At the back surface of the resin-coated paper, the mountain was present with a number of 66 within the 8 mm reference length. A ratio of the total length of a mean line across the mountain part of the sectional surface curve to the total length of a mean line across a valley part of the same was 1/12. In the same manner as in Example 1 except for the above, a recording material for ink-jet printing of Example 6 was obtained and evaluated in the same manner as in Example 1. The results are shown in Table 1.

Example 7

In the same manner as in Example 1 except for changing the support to that wherein a back-coating layer with the following formulation was further provided by coating with a solid content of 300 $mg/m^2$ at the back surface of the polyolefin resin-coated paper and dried, a polyolefin resin-coated paper was prepared. Rz at the back surface of the support was 20 μm and the mountain was present with a number of 66 within the 8 mm reference length. A ratio of the total length of a mean line across the mountain part of the sectional surface curve to the total length of a mean line across a valley part of the same was 1/8. In the same manner as in Example 1 except for the above, a recording material for ink-jet printing of Example 7 was obtained and evaluated in the same manner as in Example 1. The results are shown in Table 1.

| <Back-coating liquid> | |
|---|---|
| Polyvinyl alcohol (PVA117, trade name, available from Kraray Co., Japan) | 90 parts |
| Calcium carbonate (Tamapearl TP-123, trade name, available from Okutama Kogyosha, Japan) | 10 parts |

Example 8

In the same manner as in Example 1 except for changing the formulation of the ink-receptive layer to that shown below, a recording material for ink-jet printing of Example 8 was obtained. Rz at the surface of the support on which the ink-receptive layer was provided by coating was 13 μm. In the same manner as in Example 1, the recording material for ink-jet printing was evaluated in the same manner as in Example 1. The results are shown in Table 1.

| <Ink-receptive layer coating liquid> | |
|---|---|
| Fumed silica<br>(Average primary particle size: 7 nm, Specific surface area by the BET method: 300 $m^2/g$) | 100 parts |
| Dimethyldiallyl ammonium chloride homopolymer | 4 parts |
| Boric acid | 3 parts |
| Polyvinyl alcohol<br>(Saponification degree: 88%, Average polymerization degree: 3,500) | 40 parts |
| Surfactant | 0.3 part |

Example 9

In the same manner as in Example 1 except for changing the formulation of the ink-receptive layer to that shown below, a recording material for ink-jet printing of Example 9 was obtained. Rz at the surface of the support on which the ink-receptive layer was provided by coating was 15 μm. In the same manner as in Example 1, the recording material for ink-jet printing was evaluated. The results are shown in Table 1.

| <Ink-receptive layer coating liquid> | |
|---|---|
| Fumed silica<br>(Average primary particle size: 21 nm, Specific surface area by the BET method: 100 $m^2/g$) | 100 parts |
| Dimethyldiallyl ammonium chloride homopolymer<br>(Shallol DC902P, trade name, available from Daiichi Kogyo Seiyaku K. K., Japan, molecular weight (Mw): 9000) | 4 parts |
| Basic poly(aluminum hydroxide)<br>(Pyurakemu WT, trade name, available from Riken Green K. K., Japan) | 4 parts |
| Boric acid | 3 parts |
| Polyvinyl alcohol<br>(Saponification degree: 88%, Average polymerization degree: 3,500) | 20 parts |
| Surfactant | 0.3 part |

Example 10

In the same manner as in Example 1 except for changing the cooling roll at the front surface, a polyolefin resin-coated paper having Rz at the back surface of 21 μm was prepared. In the same manner as in Example 1 except for the above, a recording material for ink-jet printing of Example 10 was obtained. Rz at the surface of the support on which the ink-receptive layer was provided by coating was 21 μm. In the same manner as in Example 1, the recording material for ink-jet printing was evaluated. The results are shown in Table 1.

Example 11

In the same manner as in Example 1 except for subjecting to extrusion coating by using a resin composition comprising 100 parts by weight of a low density polyethylene resin having a density of 0.918 g/$cm^3$ at the back surface resin extrusion coating of the polyolefin resin-coated paper support which had been melted at 320° C. and a film thickness of 38 μm, and extrusion coating was carried out by using a cooling roll subjected to roughening treatment, a recording material for ink-jet printing of Example 11 was obtained. Rz at the back surface of the resin-coated support was 17 μm and the mountain was present with a number of 60 within the 8 mm reference length. A ratio of the total length X of a mean line across the mountain part of the sectional surface curve to the total length Y of a mean line across a valley part of the same, X/Y was 1/8. In the same manner as in Example 1 except for the above, the recording material for ink-jet printing was evaluated in the same manner as in Example 1. The results are shown in Table 1.

Comparative Example 1

In the same manner as in Example 1 except for changing a cooling roll for the back surface, a polyolefin resin-coated paper having Rz at the back surface thereof of 10 μm was obtained. The mountain at the back surface of the resin-coated paper was present with a number of 100 within the 8 mm reference length. A ratio of the total length of a mean line across the mountain part of the sectional surface curve to the total length of a mean line across a valley part of the same was 1/10. In the same manner as in Example 1 except for the above, a recording material for ink-jet printing of Comparative example 1 was obtained and evaluated in the same manner as in Example 1. The results are shown in Table 1.

Comparative Example 2

In the same manner as in Comparative example 1 except for using a support prepared by further providing the following back-coating liquid at the back surface of the polyolefin resin-coated paper with a solid content of 5 g/$m^2$ and drying, a recording material for ink-jet printing of Comparative example 2 was obtained. Rz at the back surface of the support was 9 μm and the mountain at the back surface of the resin-coated paper was present with a number of 100 within the 8 mm reference length. A ratio of the total length of a mean line across the mountain part of the sectional surface curve to the total length of a mean line across a valley part of the same was 1/9. In the same manner as in Example 1 except for the above, and evaluated in the same manner as in Example 1. The results are shown in Table 1.

| <Back-coating liquid> | |
|---|---|
| Polyvinyl alcohol (PVA117, trade name, available from Kraray Co., Japan) | 95 parts |
| Metal soap type lubricant (Calcium stearate, available from Nippon Kaseisha, Japan) | 5 parts |

TABLE 1

| | Feeding and conveying characteristics | Anti-blocking property | Flaw property | Ink absorption property | Glossiness |
|---|---|---|---|---|---|
| Example 1 | ○ | ○ | ○ | ○ | ○ |
| Example 2 | ○ | ○ | ○ | ○ | ○ |
| Example 3 | Δ | Δ | ○ | ○ | ○ |
| Example 4 | Δ | Δ | ○ | ○ | ○ |
| Example 5 | Δ | Δ | ○ | ○ | ○ |
| Example 6 | Δ | Δ | Δ | ○ | ○ |
| Example 7 | ○ | ○ | ○ | ○ | ○ |
| Example 8 | ○ | ○ | ○ | Δ | ○ |
| Example 9 | ○ | ○ | ○ | ○ | Δ |
| Example 10 | Δ | ○ | ○ | ○ | Δ |
| Example 11 | Δ | ○ | ○ | ○ | ○ |
| Comparative example 1 | X | X | ○ | ○ | ○ |
| Comparative example 2 | Δ | X | ○ | ○ | ○ |

The recording materials for ink-jet printing of the present invention are excellent in ink absorption property and glossiness, feeding and conveying characteristics in a printer of which are good, and flaws of the ink-receptive layer at the time of preparation, processing and handling are not caused.

In the recording material of Example 2 in which no subbing layer is provided, adhesiveness between the support and the ink-receptive layer, and glossiness of the ink-receptive layer were slightly lowered as compared with those of Example 1, but the other characteristics are the same as the recording material of Example 1. In Example 3, the Rz at the back surface thereof was 12 μm which is smaller than 20 μm of Example 1 and the ratio of the total length at the mountain part and the valley part of the mean line of the sectional surface curve was 1/1 which means the mountain part is larger than 1/8 of Example 1 so that feeding and conveying characteristics and anti-blocking property were lowered than the recording material of Example 1, but they were in a practically usable level and the other characteristics of the ink-receptive layer were good. In Example 4, the Rz at the back surface was 40 μm which is larger than that of Example 1 and the number of the mountain at the 8 mm length was small as 15 and the part of the mountain became larger as the ratio of the total length at the mountain part and the valley part of the mean line of the sectional surface curve of 3/1, so that feeding and conveying characteristics, anti-blocking property and flaw property of the ink-receptive layer were lowered than those of Example 1.

In Example 5, the part of the mountain became larger as the ratio of the total length at the mountain part and the valley part of the mean line of the sectional surface curve at the back surface of 4/1, so that feeding and conveying characteristics and anti-blocking property were lowered than those of Example 1 but there is no problem for practical use. Example 6 is a case wherein the part of the mountain became smaller as the ratio of the total length at the mountain part and the valley part of the mean line of the sectional surface curve at the back surface of 1/12, and feeding and conveying characteristics, anti-blocking property and flaw property of the ink-receptive layer were lowered than those of Example 1 but there is no problem for practical use. In Example 7, a back-coating layer with 300 mg/$m^2$ was provided and the characteristics such as Rz, etc. of the back surface were the same with those of Example 1, and the characteristics such as feeding and conveying characteristics, anti-blocking property and flaw property of the ink-receptive layer were the same as those of Example 1 and pencil writability of the back surface was improved. Example 8 is a case wherein the hydrophilic polymer to the fumed silica in the ink-receptive layer was increased from 20% of Example 1 to 40%, and ink absorption property was lowered but there is no problem for practical use and the other characteristics were the same as those of Example 1.

In Example 9, the Rz at the surface of the ink-receptive layer was 15 μm which is larger than that of Example 1, substantially the same characteristics as those of Example 1 were shown except that glossiness was slightly lowered. In Example 10, the Rz at the surface of the ink-receptive layer was 21 μm which is further larger than that of Example 1, glossiness was further lowered and feeding and conveying characteristics were also lowered but there is no problem for practical use.

Example 11 is a sample in which the polyolefin resin at the back surface of Example 1 was made a low density polyethylene resin alone and a thickness to 38 μm, and curl property is slightly inferior to that of Example 1 so that feeding and conveying characteristics were lowered but it had a level for a practical use.

In Comparative example 1, the Rz at the back surface was 10 μm which is smaller than 12 μm of Example 3 so that feeding and conveying characteristics and anti-blocking property are remarkably lowered so that it could not be used practically. In Comparative example 2, a back-coating layer containing a metal soap type lubricant was provided and feeding and conveying characteristics were slightly improved as compared with that of Comparative example 1 but anti-blocking property was poor.

According to the present invention, a recording material for ink-jet recording having good printer feeding and conveying characteristics, anti-blocking property, flaw property of the ink-receptive layer, ink absorption property and glossiness can be obtained.

What is claimed is:

1. An ink-jet recording material comprising a support in which both surfaces of a base paper are covered by a polyolefin resin layer, and an ink-receptive layer containing inorganic particles and a hydrophilic binder provided on the support, wherein a surface of the polyolefin resin layer of the support opposite to the surface at which the ink-receptive layer is provided has been subjected to embossing treatment to have a ten-point mean roughness Rz measured according to JIS-B-0601 of boarding is 12 to 40 μm under the condition of a reference length of 8 mm.

2. The ink-jet recording material according to claim 1, wherein the inorganic particles are fumed silica.

3. The ink-jet recording material according to claim 1, wherein an opposed surface of the surface on which the ink-receptive layer is provided of the support coated by the polyolefin resin has 10 or more mountain of a sectional surface curve under the condition of a reference length of 8 mm according to JIS-B-0601, and a ratio of a total length X of a mean line across the mountain part to a total length Y of a mean line across a valley part, X/Y is 1/10 to 3/1.

4. The ink-jet recording material according to claim 1, wherein a back coating layer mainly comprising a binder is provided at the surface of the polyolefin resin layer of the support opposite to the surface at which the ink-receptive layer is provided, said back coating layer being a solid component of 100 to 500 $mg/m^2$.

5. The ink-jet recording material according to claim 2, wherein the fumed silica has an average primary particle size of 3 nm to 30 nm.

6. The ink-jet recording material according to claim 2, wherein the fumed silica has an average primary particle size of 3 nm to 10 nm and a specific surface area measured by the BET method of 250 to 500 $m^2/g$.

7. The ink-jet recording material according to claim 1, wherein the ink-receptive layer contains fumed silica in an amount of 10 to 30 $g/m^2$ and the hydrophilic binder of 10 to 30% by weight based on the amount of the fumed silica.

8. The ink-jet recording material according to claim 1, wherein the ink-receptive layer-coated surface has a ten-point mean roughness Rz measured according to JIS-B-0601 is 18 μm or shorter under the condition of a reference length of 8 mm.

9. The ink-jet recording material according to claim 1, wherein the polyolefin resin layer at the surface opposed to the surface on which the ink-receptive layer is provided on the support contains a high density polyethylene resin having a density of 0.95 $g/cm^3$ and a content of the high density polyethylene resin is 150% by weight or more based on the total amount of the hydrophilic binder.

10. The ink-jet recording material according to claim 1, wherein the hydrophilic binder contained in the ink-receptive layer is polyvinyl alcohol.

* * * * *